United States Patent [19]

Izumi

[11] Patent Number: 5,361,299
[45] Date of Patent: Nov. 1, 1994

[54] EXCHANGE APPARATUS ENCLOSING A PLURALITY OF EXTENSION TERMINALS AND CONNECTING AN EXTENSION TERMINAL TO A LINE WIRE

[75] Inventor: Michihiro Izumi, Yokohama, Japan

[73] Assignee: Canon Kabushiki Kaisha, Tokyo, Japan

[21] Appl. No.: 197,531

[22] Filed: Feb. 16, 1994

Related U.S. Application Data

[63] Continuation of Ser. No. 142,067, Oct. 20, 1993, abandoned, which is a continuation of Ser. No. 589,265, Sep. 28, 1990, abandoned.

[30] Foreign Application Priority Data

Sep. 28, 1989 [JP] Japan .................................. 1-254607

[51] Int. Cl.⁵ ............................................. H04M 3/64
[52] U.S. Cl. ...................................... 379/252; 379/96; 379/100; 370/110.1
[58] Field of Search .................... 379/96, 98, 100, 242, 379/265, 233, 252; 358/434, 435, 436, 441; 375/7, 8; 370/110.1

[56] References Cited

U.S. PATENT DOCUMENTS

| | | | |
|---|---|---|---|
| 4,680,781 | 7/1987 | Amundson et al. | 375/8 |
| 4,894,847 | 1/1990 | Tjahjadi et al. | 375/8 |
| 4,958,153 | 9/1990 | Murata et al. | 370/94.1 |
| 4,961,185 | 10/1990 | Sawada | 370/110.1 |
| 5,001,709 | 3/1991 | Satoh | 370/110.1 |
| 5,093,857 | 3/1992 | Yoshida et al. | 379/96 |

FOREIGN PATENT DOCUMENTS

1-109952  4/1989  Japan .................................... 379/94

OTHER PUBLICATIONS

Control Cable Inc Catalog (1988), Modems on pp. 82 and 83.
Telecommunications Magazine, vol. 23, No. 3, p. 46 "V.32" (Mar. 1989).

Primary Examiner—James L. Dwyer
Assistant Examiner—Ahmad F. Matar
Attorney, Agent, or Firm—Fitzpatrick, Cella, Harper & Scinto

[57] ABSTRACT

An exchange apparatus which encloses a plurality of extension terminals and connects the extension terminal designated by a signal from a line wire to the line wire, includes: a memory to store an attribute of the extension terminal; a comparator to compare an attribute designated by the signal from the line wire such as a transmission side terminal with the attribute of the extension terminal stored in the memory; and a changing circuit for changing the attribute of the extension terminal stored in the memory so as to coincide with the attribute designated by the signal from the line wire in the case where the result of the comparison by the comparator indicates that the attributes differ. Even if an attribute such as a data transmission rate or the like of the transmission side terminal differs from an attribute of the data terminal connected to the extension, communication can be started without disconnecting a call and the operating efficiency can be raised.

11 Claims, 9 Drawing Sheets

EXCHANGE APPARATUS ENCLOSING A PLURALITY OF EXTENSION TERMINALS AND CONNECTING AN EXTENSION TERMINAL TO A LINE WIRE

This application is a continuation-in-part of application Ser. No. 08/142,067 filed on Oct. 20, 1993, which is a continuation of prior application Ser. No. 07/589,265 filed on Sep. 28, 1990 (both are now abandoned).

BACKGROUND OF THE INVENTION

1. Field of the Invention

The present invention relates to an exchange apparatus which encloses a plurality of extension apparatuses and connects an extension terminal which was designated to extend from a line wire to the line wire.

2. Related Background Art

Hitherto, in a telephone exchange apparatus which can be connected to a digital network such as an ISDN or the like having the function to transmit attribute information of a transmission side terminal to a reception side terminal, when a call was received by a data terminal connected to the extension, if the attributes of the transmission side terminal and the reception side terminal differ, communication matching between the transmission and reception terminals cannot be obtained. Therefore, the telephone exchange apparatus executes a process to transmit a release completion message to the transmission side terminal or the like.

In the above example, the "attribute" indicates the information which needs to obtain the matching upon communication. For instance, in the ISDN, the "attribute" denotes the information which needs to obtain the matching upon communication such as synchronous/asynchronous data, the transmission rate, telephone/G3, and the like which are included in high order layer matching information elements, low order layer matching information element, and the like.

Therefore, in a telephone exchange apparatus which can be connected to a digital network such as an ISDN or the like having the function to transmit attribute information of a transmission side terminal to a reception side terminal, when a call is received by a data terminal connected to an extension, if the attributes such as data transmission rates or the like of the transmission side terminal and the reception side terminal differ, there occur inconveniences such that the call is disconnected, the communication cannot be started, and the like.

The above problems will now be described hereinbelow with reference to the drawings.

Figures 6, 6A:
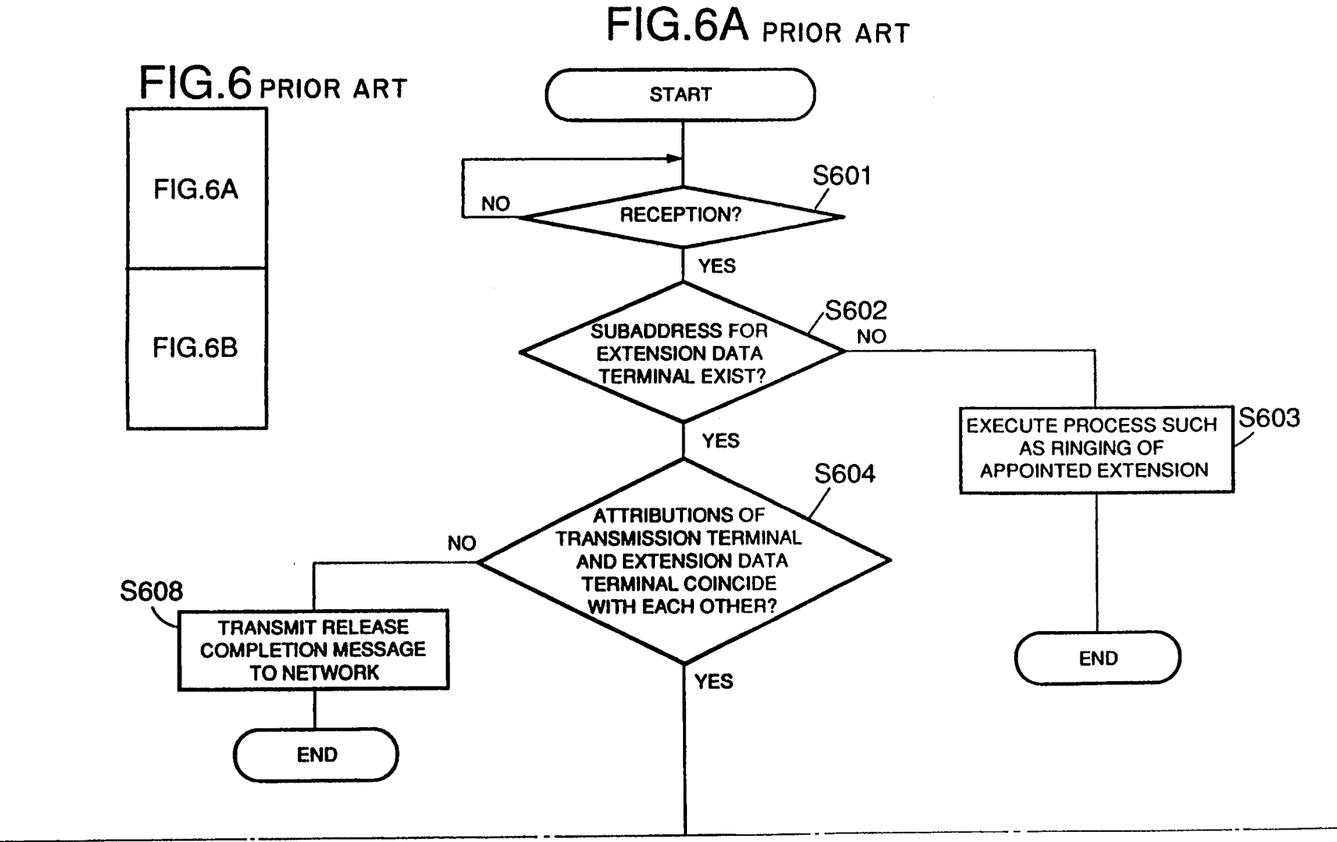
Figure 6B:
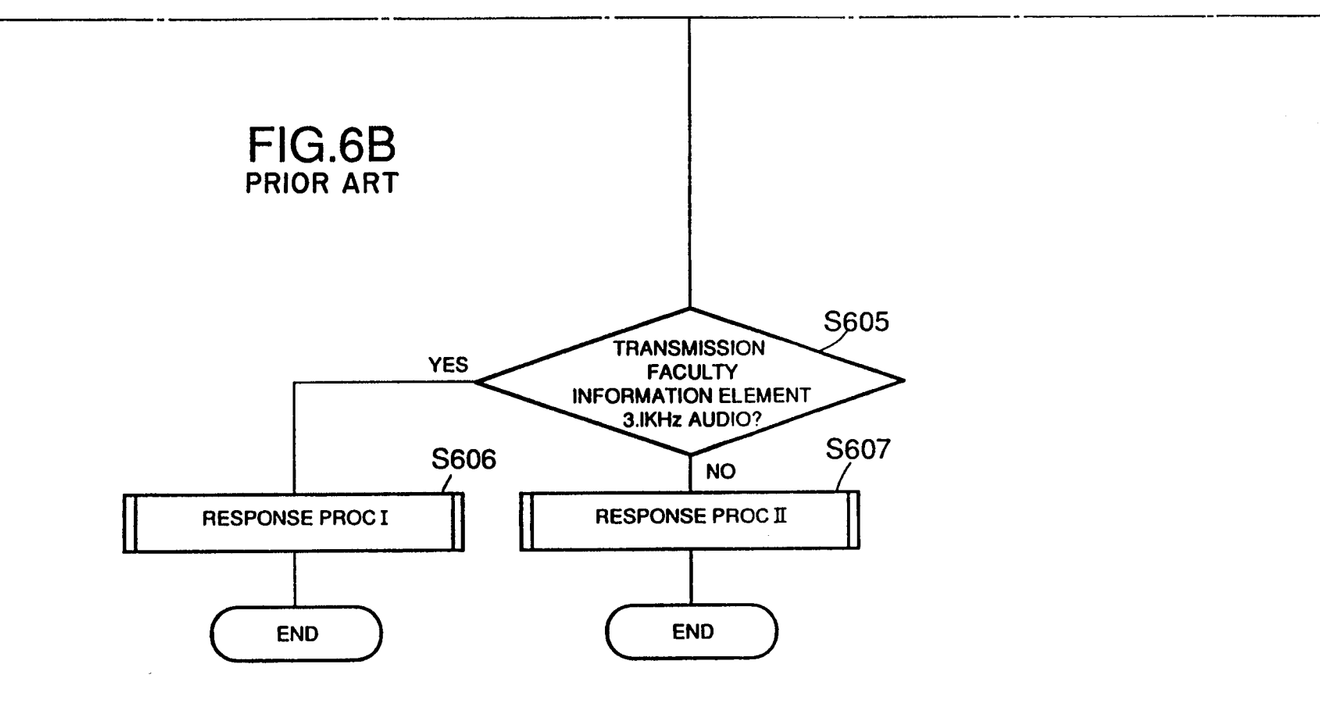

FIG. 6 is a flowchart showing the operation of a telephone exchange apparatus in the case where a call was transmitted from an ISDN and received by a data terminal connected to an extension of a conventional telephone exchange apparatus.

The conventional telephone exchange apparatus in the above case operates in the following manner.

That is, in the diagram, a check is made to see if a call has been received or not in step S601. If YES and when a call set message has been received from the network, an ISDN interface in the telephone exchange apparatus checks the content of a received subaddress information element in the call set message (step S602). Practically speaking, the presence or absence of the subaddress for the extension data terminal is discriminated. Thus, if the subaddress shown in the received subaddress information element differs from the subaddress of the data terminal connected to the extension, a receiving process such that an appointed extension is rung or the like is executed (step S603). On the other hand, if the subaddress exists and those subaddresses coincide (Step S602), the processing routine advances to step S604.

That is, if the subaddress shown in the received subaddress information element coincides with the subaddress of the data terminal connected to the extension telephone, step S604 follows. In step S604, a check is made to see if the high order layer matching information element and low order layer matching information element (attributes) of the transmission side terminal coincide with the high order layer matching information element and low order layer matching information element of the extension data terminal designated by the subaddress or not.

If the attributes of the transmission side terminal and the reception side terminal coincide as a result of the discrimination in step S604, step S605 follows. In step S605, a check is made to see if a transmission faculty information element of a call set message indicates a 3.1 kHz audio signal or an unlimited digital signal. A predetermined response process is executed in accordance with the result of the discrimination, thereby setting a communicable state. That is, if the transmission faculty information element indicates the 3.1 kHz audio signal, a response process I corresponding to it is executed (step S606). On the other hand, if it indicates the unlimited digital signal, a response process II corresponding to it is performed (step S607). Then, the program is finished.

On the other hand, in step S604, if the attributes such as data transmission rates or the like of the transmission side terminal and the reception side terminal, that is, the attributes between the transmission side terminal and the extension data terminal in this case differ, step S608 follows and the program is finished. That is, if the attributes of the transmission side terminal and the reception side terminal differ as a result of the discrimination in step S604, a release completion message is sent to the network.

As mentioned above, in the conventional apparatus, if the call was received by the data terminal connected to the extension, when the attributes of the transmission side terminal and the reception side terminal differ, the process to send the release completion message to the transmission side terminal or the like is executed. Therefore, the call is disconnected and there are the drawbacks that 1) in order to perform communication, it is necessary to change the setting after confirming the attribute of the partner side terminal and to newly start the communication process, and that 2) the operating efficiency is poor.

SUMMARY OF THE INVENTION

It is an object of the invention to improve the operating efficiency of an exchange apparatus.

Another object of the invention is to enable a communication operation to be started without disconnecting a call in the case where attributes on the originating call side and the terminating call side differ.

Still another object of the invention is to provide an exchange apparatus which can change the set attribute and can make it coincide with the attribute which was designated from a line wire in the case where the attribute designated from the line wire differs from a preset attribute of an extension terminal.

Still another object of the invention is to provide an exchange apparatus which allows the attribute designated from a line wire to be displayed by an extension.

Another object of the invention is to provide an exchange apparatus which allows the attribute designated from a line wire to be displayed by an extension and enables the operator to change the attribute of the extension terminal to the attribute designated from the line wire.

The above and other objects and features of the present invention will become apparent from the following detailed description and the appended claims with reference to the accompanying drawings.

BRIEF DESCRIPTION OF THE DRAWINGS

FIG. 1-1B is a block diagram of a telephone exchange apparatus according to an embodiment of the present invention;

FIG. 3-3B is a flowchart showing an example of the operation in the case where a call was transmitted from an ISDN and received by a data terminal connected to an extension of the telephone exchange apparatus of FIG. 1;

FIG. 6-6B is a flowchart showing the operation in the case where a call was transmitted from an ISDN and received by a data terminal connected to an extension of a conventional telephone exchange apparatus.

DETAILED DESCRIPTION OF THE PREFERRED EMBODIMENT

One embodiment relates to a private branch exchange which can connect a digital network having the function to transmit attribute information of a transmission side terminal to a reception side terminal, wherein attribute information of a data terminal connected to a telephone set is stored. The private branch exchange of embodiment compares the attribute information of the transmission side terminal which was received from the digital network with the attribute information of the data terminal which has previously been stored. If those attribute information differ as a result of the comparison, the private branch exchange of the embodiment sends all of or a part of the attribute information of the transmission side terminal to the telephone set and allows the difference between the attributes of the transmission side terminal and the reception side terminal to be displayed. By changing the setting of the attribute by the operator of the reception side terminal, communication can be performed.

An embodiment of the invention will be described hereinbelow with reference to the drawings.

Figures 1, 1A:
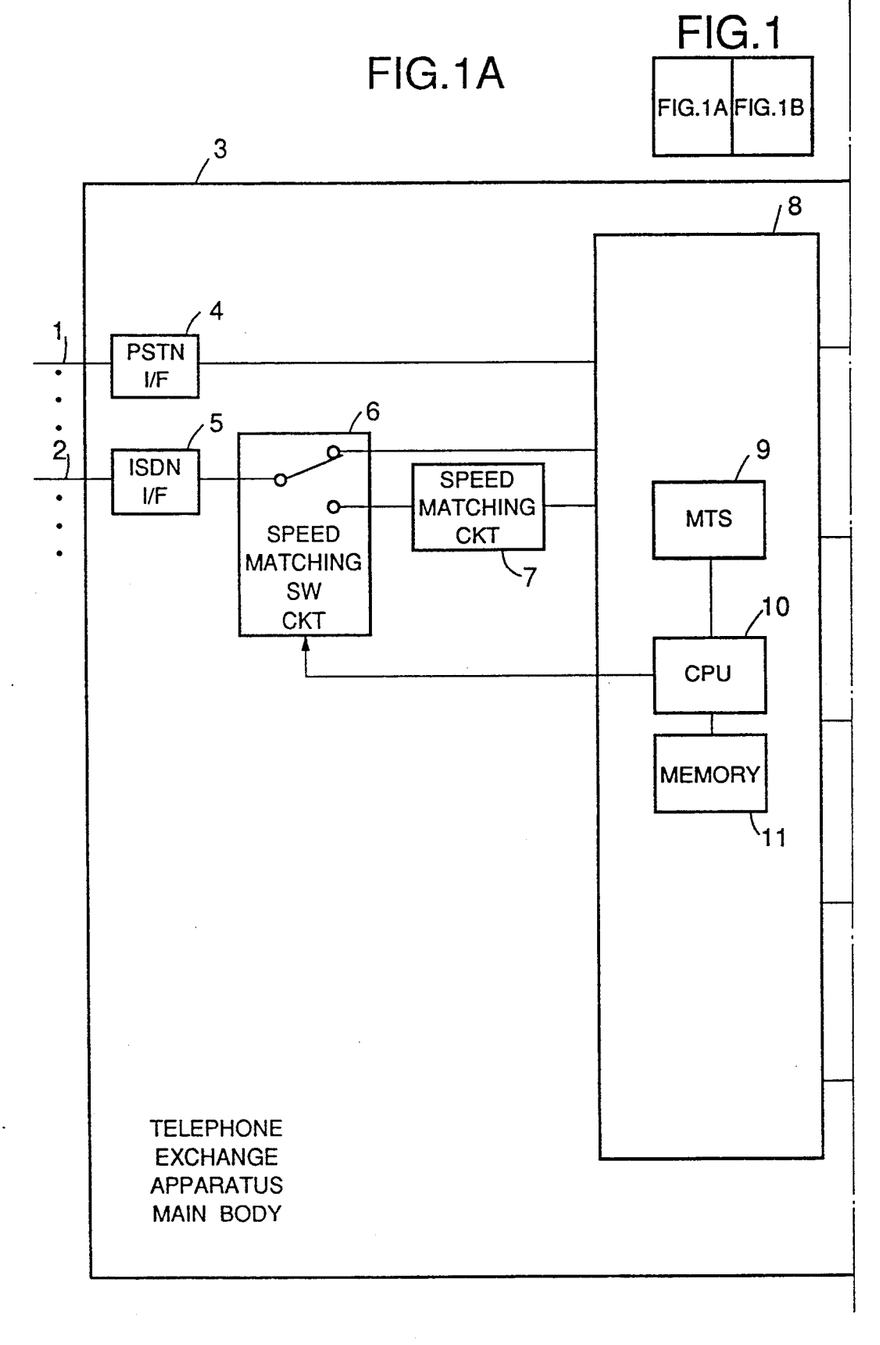
Figure 1B:
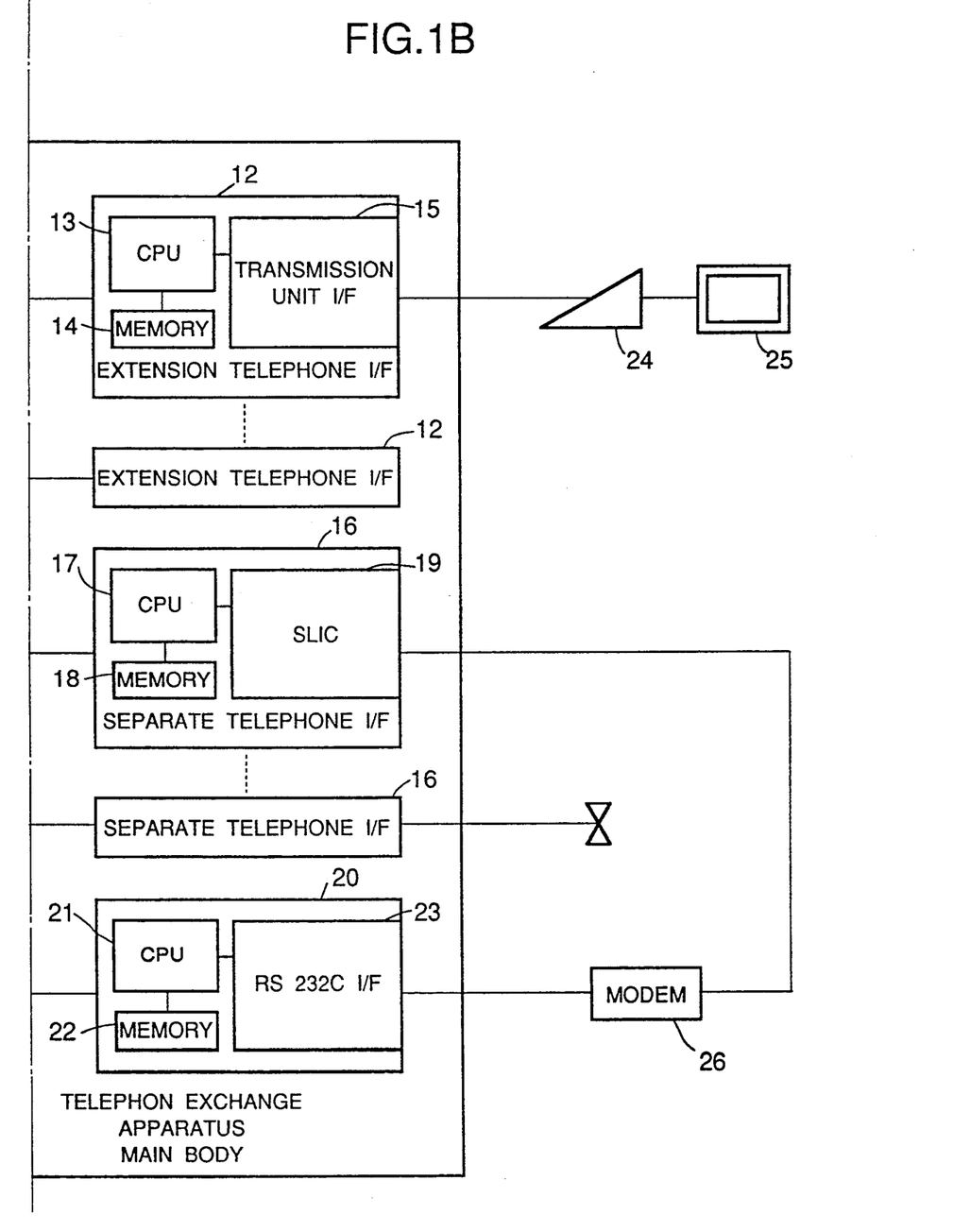

FIG. 1 is a block diagram of a telephone exchange apparatus showing an embodiment of the invention.

In the diagram, reference numeral 1 denotes an analog public network and 2 indicates an ISDN as a digital public network having the function to transmit attribute information of a transmission side terminal to a reception side terminal, respectively. A telephone exchange apparatus main body 3 executes an exchanging operation to set a path between the partner terminal and the extension terminal through the analog network 1 or the ISDN 2.

The main body 3 has: an interface system for the analog network 1; an interface system for the ISDN 2; a central control system including an exchange switch; and an interface system for an extension communication terminal as an equipment in a user's home.

The interface system to connect the analog network 1 is constructed by an analog station line interface (PSTN I/F) 4 and is connected to an exchange unit 8, which will be explained hereinlater.

The similar interface system for the ISDN 2 comprises: an ISDN interface 5; a speed matching switching circuit 6 which is constructed by a speed matching change-over switch; and a speed matching circuit 7. One change-over switch contact of the speed matching switching circuit 6 is directly connected to the exchange unit 8, which will be explained hereinlater. The other change-over switch contact is connected to the exchange unit 8 through the speed matching circuit 7.

The exchange unit 8 to which the above interface systems are connected has an exchange switch (MTS) 9, a main CPU 10, and a memory 11 comprising an RAM and an ROM. The operation of the exchange switch 9 is controlled by the main CPU 10. The attribute information of a data terminal connected to the telephone set can be stored as data into the RAM in the memory 11. The storage and setting of such data can be performed by an inputting operation using the telephone set by the operator of the data terminal.

On the other hand, various control programs to control the whole apparatus by the main CPU 10 have been stored in the ROM in the memory 11. The control programs include a program to control the apparatus in such a manner that in the case where a call is received through the ISDN 2 by a predetermined data terminal connected to an extension, if attribute information of a transmission side terminal differs from attribute information of the data terminal which received the call, the attribute information of the transmission side terminal is sent to a telephone set for correction of the data terminal which received the call.

All of or a part of the attribute information of the transmission side terminal can be transmitted to the telephone set.

On the other hand, the selective switching control for the speed matching switching circuit 6 is performed by the main CPU 10. That is, the main CPU 10 switches the speed matching change-over switch of the speed matching switching circuit 6 in FIG. 1 in accordance with whether the reception data needs the speed matching or not.

An extension telephone interface 12, a separate telephone interface 16, and a modem interface 20 are connected to the exchange unit 8. The interface 16 is used to execute a process to send a call signal to a modem 26 or the like in the execution of a response process I, which will be explained hereinlater. The interface 16 comprises a CPU 17, a memory 18, and a SLIC (single line telephone interface circuit). On the other hand, the interface 20 is used for the modem 26 and comprises a CPU 21, a memory 22, and an interface 23 which is constructed by, for instance, an RS232C interface IC.

On the other hand, the extension telephone interface 12 is used to connect a telephone set for connection of a data terminal to connect a data terminal 25 to an extension as shown in the diagram. The interface 12 comprises a CPU 13, a memory 14, and a transmission LSI 15 constructing a transmission unit I/F. An extension telephone set 24 for connection of a data terminal is connected through the interface 12 with the above construction. The data terminal is connected to the telephone set 24.

A telephone set having an interface such as RS232C, RS422, or the like can be used as a telephone set to which the data terminal is connected. The data terminal can be connected by those interfaces.

Figure 2:
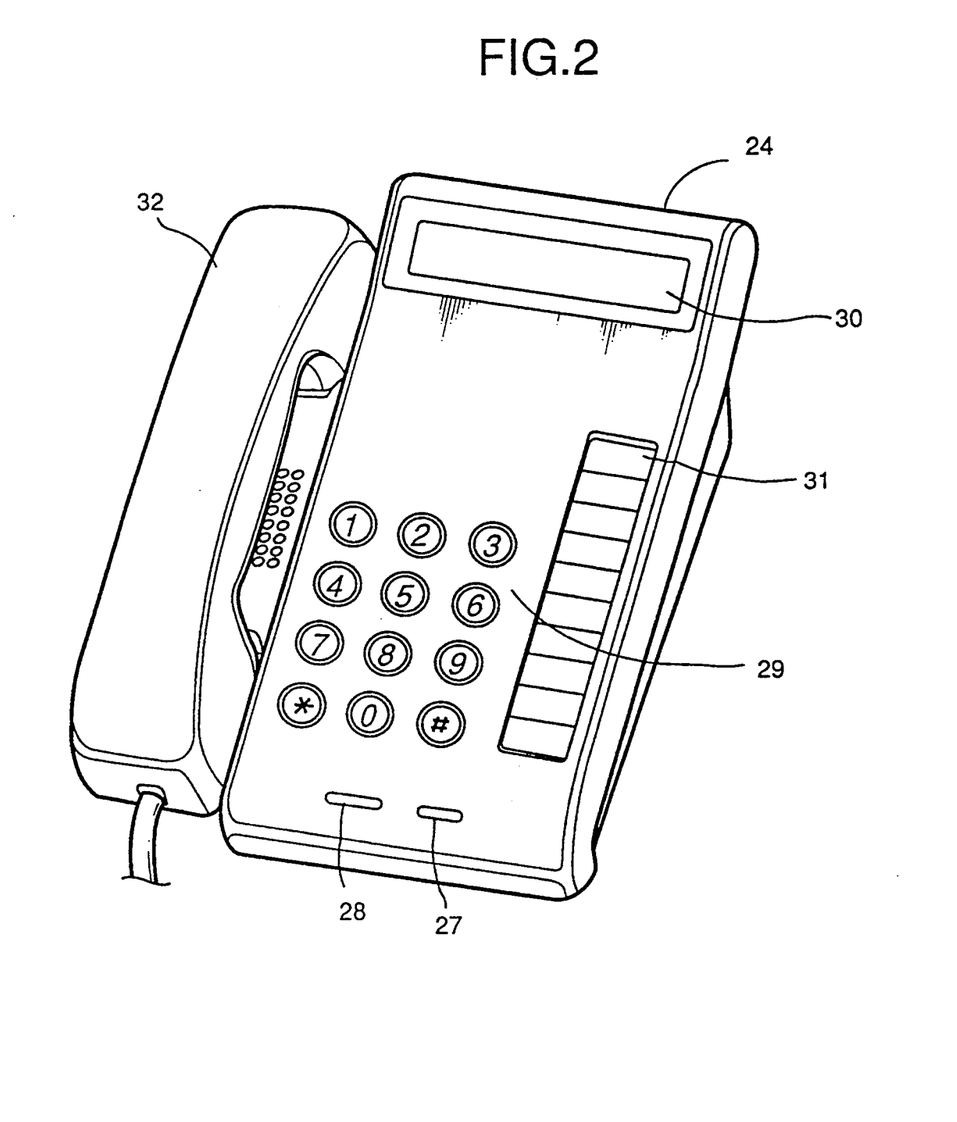
FIG. 2 is an external view showing an example of a telephone set which is connected to an extension.

FIG. 2 is an external view showing an example of the telephone set 24 which is connected to the extension. The telephone set 24 has a data key 27, a data set completion key 28, a ten-key 29, a display unit 30, an office line key 31, a receiver 32, and the like.

For instance, a liquid crystal display unit is used as a display unit 30. When information regarding an attribute of the transmission side terminal was sent from the main CPU 10 to the telephone set 24, the attribute information is displayed by the display unit 30. A practical example of a display format in this case will be explained hereinlater.

The data set completion key 28 is depressed in the case where the operator of the data terminal 25 set and changed a data transmission rate or the like of the data terminal 25 on the basis of the display of the attribute information as mentioned above. When the data set completion key 28 is depressed, the main CPU 10 of the exchange unit 8 is so informed via the extension telephone interface 12.

Further, the ten-key 29 and the like of the telephone set 24 can be used as an input unit to previously store and hold the attribute information of the data terminal 25. That is, in the embodiment, a high order layer matching information element and a low order layer matching information element of the data terminal 25 of the extension are input to the telephone set 24 by the operator of the data terminal 25 of the extension. Those elements are stored into the memory 11 of the exchange unit 8 on the basis of the above inputting operation.

The data terminal 25 is connected to the extension telephone interface 12 of the apparatus main body 3 shown in FIG. 1 through the telephone set 24 with the above construction, respectively.

The operation of the telephone exchange apparatus of the embodiment will be further practically explained hereinafter with reference to FIGS. 3 to 5 as well.

There are two cases of the reception from an analog office line and the reception from a digital office line in the telephone exchange apparatus shown in FIG. 1. However, since the embodiment relates to the case where a call is received by the data terminal of the extension from the digital network having the function to transmit the attribute information of the transmission side terminal to the reception side terminal, the case of the reception from the digital office line, i.e., the ISDN 2 to the data terminal 25 will now be described in the following embodiment.

On the other hand, it is assumed that the operator of the data terminal 25 of the extension has already input the high order layer matching information element and low order layer matching information element of the data terminal 25 of the extension into the telephone set 24 and that the data which was input into the telephone set 24 has been stored in the memory 11 of the exchange unit 8 through the telephone interface 12.

Figure 3:
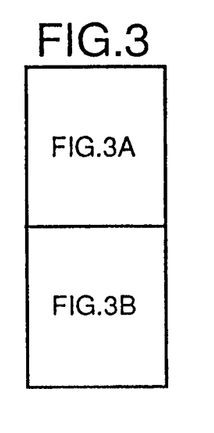
Figure 3A:
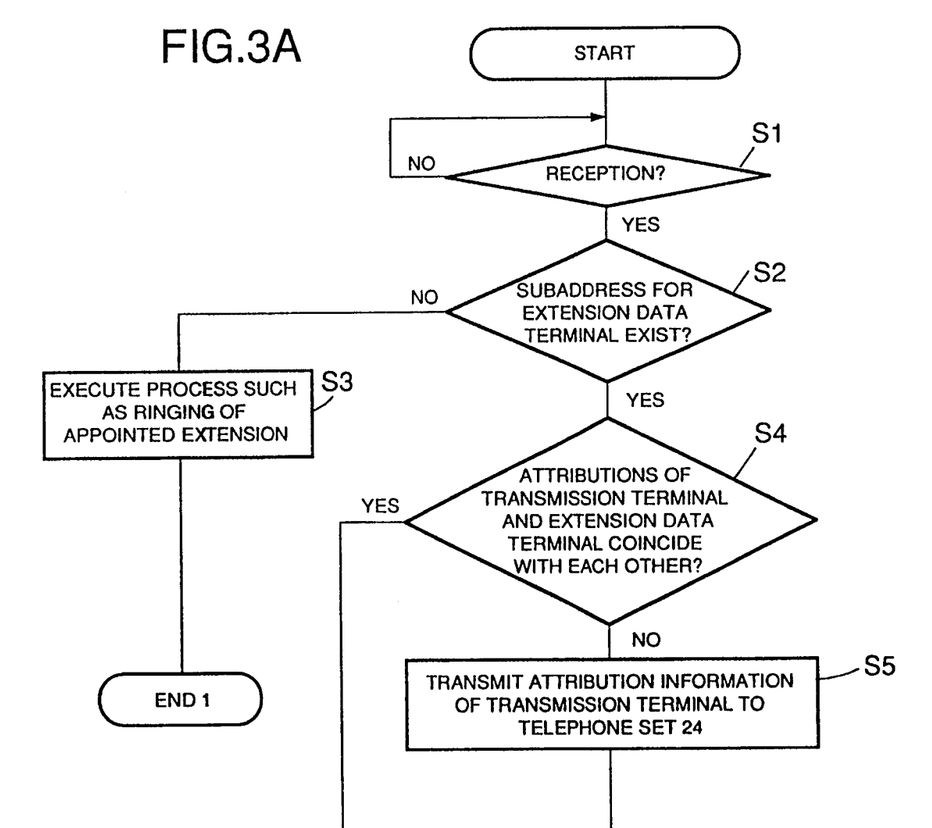
Figure 3B:
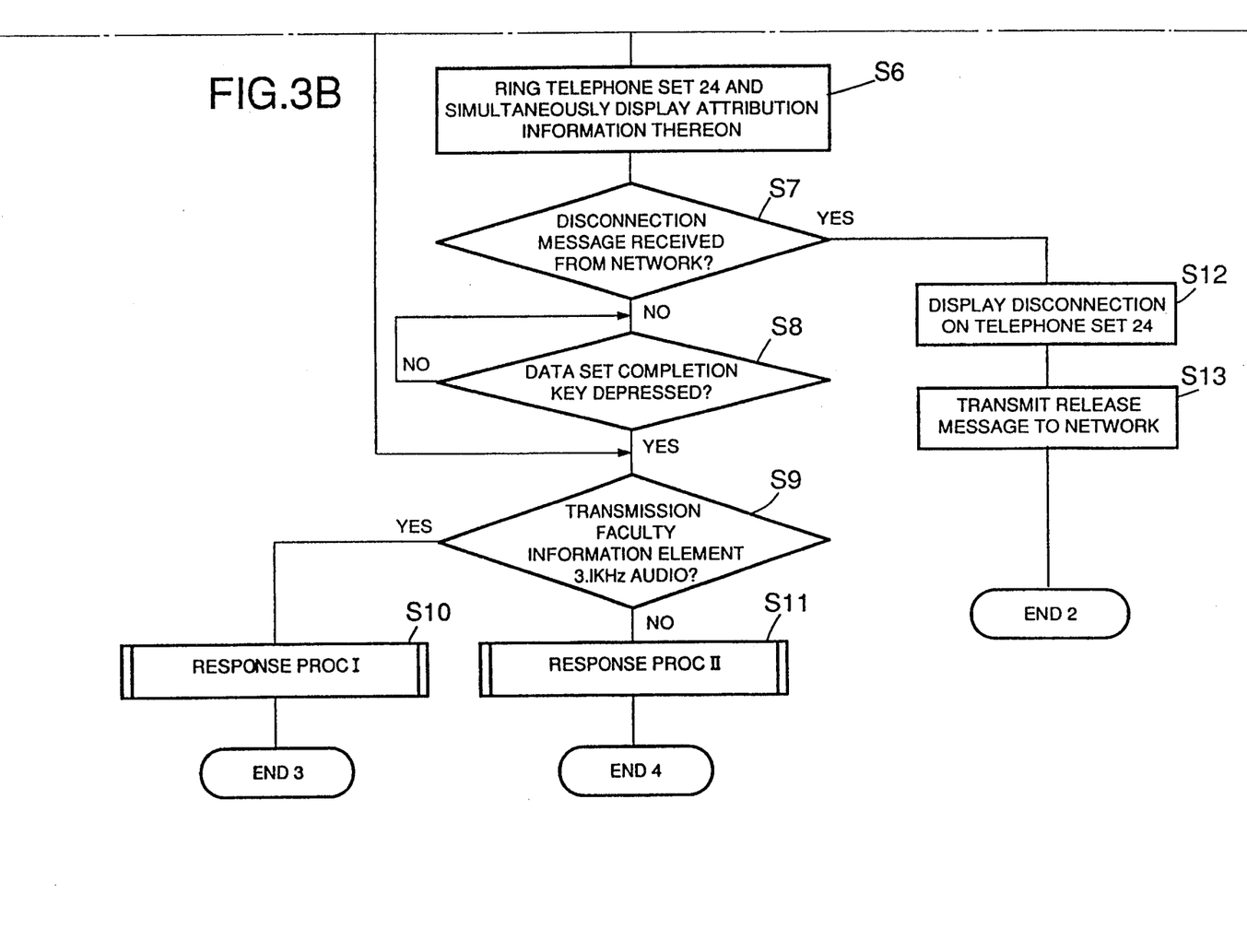

FIG. 3 is a flowchart showing the operation in the case where a call was received from the ISDN 2 to the data terminal 25 connected to the extension of the telephone exchange apparatus of FIG. 1.

In the diagram, when the main CPU 10 receives a call set message from the network (ISDN) (step S1), the ISDN interface 5 checks the content of the received subaddress information element in the call set message (step S2). If the call is not for the data terminal 25 connected to the extension as a result of the discrimination of the received subaddress information element, a reception process to ring an appointed extension or the like is performed (step S3).

On the other hand, if the call is for the data terminal 25 connected to the extension (step S2), the main CPU 10 checks to see if the high order layer matching information element and low order layer matching information element (attributes) of the transmission side terminal coincide with the high order layer matching information element and low order layer matching information element of the data terminal 25 of the extension designated by the subaddress or not (step S4).

In the embodiment, the comparison between the attribute information of the transmission side terminal which was received and the attribute information of the data terminal 25 in step S4 is executed by reading out the (preset) information held in the memory 11 of the exchange unit 8 with respect to the attribute information of the data terminal 25. If those attribute information differ as a result of the comparison, the processing routine advances to step S5 and subsequent steps. On the other hand, if YES in step S4, the processes in step S5 and subsequent steps are skipped and the processing routine directly advances to step S9.

That is, if the attribute information of the transmission side terminal and the reception side terminal coincide as a result of the discrimination in step S4, the processes in steps S5 to S8 shown in the flowchart are unnecessary, so that the processing routine directly advances from step S4 to step S9. In step S9, the main CPU 10 checks whether a transmission faculty information element of the call set message indicates a 3.1 kHz audio or an unlimited digital.

Figure 4:
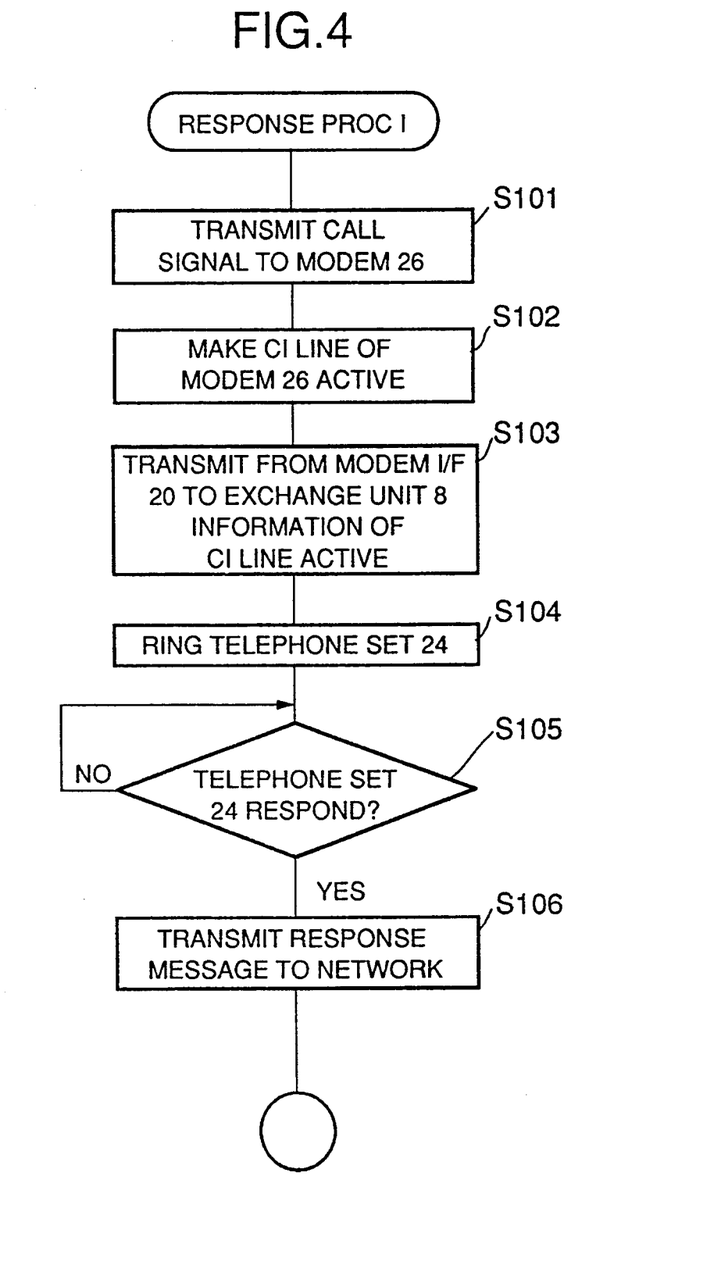
FIG. 4 is a flowchart showing an example of a response process in the case where a transmission faculty information element which is executed in step S10 in FIG. 3 indicates a 3.1 kHz audio signal.

If the transmission faculty information element indicates the 3.1 kHz audio (step S9), a response process I shown in FIG. 4 is executed (step S10).

Figure 5:
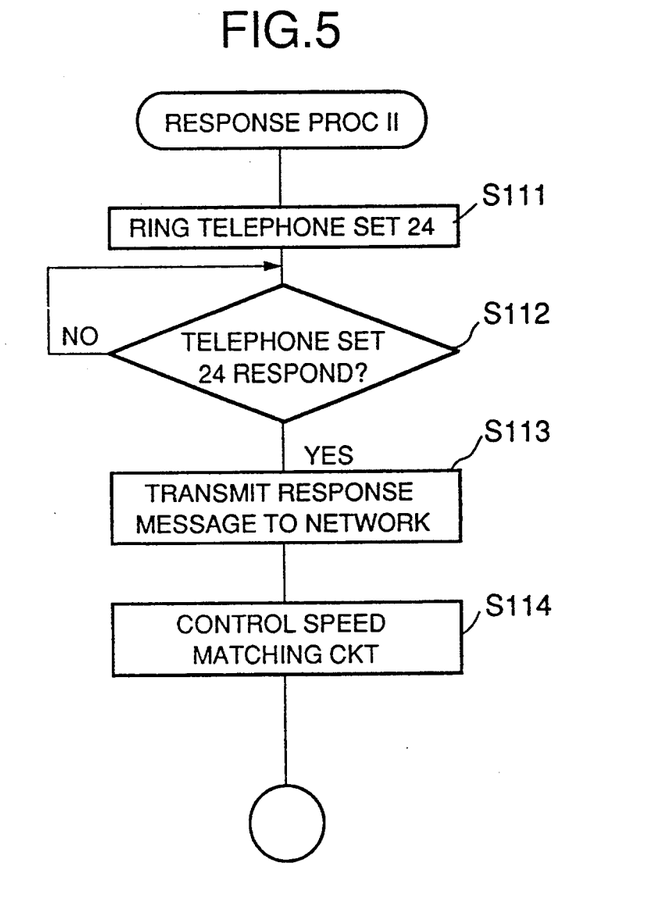
FIG. 5 is a flowchart showing an example of a response process in the case where a transmission faculty information element which is executed in step S11 in FIG. 3 indicates an unlimited digital signal.

If the transmission faculty information element indicates the unlimited digital signal (NO in step S9), a response process II shown in FIG. 5 is executed (step S11).

FIG. 4 shows a flowchart of an example of the response process I which is executed in step S10 in the case where the transmission faculty information element indicates the 3.1 kHz audio. FIG. 5 shows a flowchart of an example of the response process II which is executed in step S11 in the case where the transmission faculty information element indicates the unlimited digital.

In the response process I shown in FIG. 4, processes to transmit a call signal to the modem 26, to make the CI line of the modem 26 active, and to transmit the information indicating that the CI line was made active to the exchange unit 8 (steps S101 to S103) are executed. Thereafter, the telephone set 24 is rung (step S104).

That is, in step S101, the main CPU 10 first transmits the call signal to the modem 26 via the separate telephone interface 16. Then, the CI line of the modem 26 is made active (step S102). The modem interface 20 sends the information indicating that the CI line was made active to the exchange unit 8 (step S103). After that, the main CPU 10 rings the telephone set 24 via the extension interface 12 (step S104). A check is made to see if the telephone set 24 has responded or not (step S105). If the operator of the extension data terminal 25 has depressed the data key 27 of the telephone set 24 (step S105), the main CPU 10 sends a response message from the ISDN interface 5 to the network (ISDN), thereby setting the communicable state (step S106). On the other hand, the telephone set 24 connects the interface 12 to the data terminal 25. The main CPU 10 controls the MTS 9 and connects the ISDN 2 to the modem 26 via the interface 16, and connects the data terminal 25 to the modem 26 through the interfaces 12 and 20.

The response process is finished as mentioned above and the communication is started.

On the other hand, if the transmission faculty information element indicates the unlimited digital, the response process II shown in FIG. 5 is executed. In the case of the response process I, the telephone set is rung after completion of the processes in steps S101 to S103. However, in the case of FIG. 5, the telephone set ringing process is soon executed. That is, the main CPU 10 first rings the telephone set 24 through the extension interface 12 (step S111). A check is made to see if the telephone set 24 has responded or not (step S112) in a manner similar to the above. If it is detected that the operator of the extension data terminal 25 depressed the data key 27, the main CPU 10 sends a response message from the ISDN interface 5 to the network (ISDN) (step S113), thereby setting the communicable state.

However, in this case, it is necessary that the data of 64 Kbps which was received from the network is converted into the transmission rate of the extension data terminal by the speed matching circuit 7. Therefore, the process in step S114 subsequent to step S113 is executed and the response process II is finished.

The contents of the operations in the response processes I and II may be coincident with the operations which are executed when the attribute information of the transmission side terminal and the reception side terminal in the conventional example coincide.

On the other hand, if NO in step S4, that is, if the attribute information differ, different from the conventional example, the main CPU 10 of the apparatus does not execute the process to send a release completion message to the transmission side terminal but first sends the attribute information of the transmission side terminal to the telephone set 24.

That is, if the attribute information of the transmission side terminal and the reception side terminal differ as a result of the discrimination in step S4, the main CPU 10 of the telephone exchange apparatus in the embodiment sends the attribute information of the transmission side terminal to the telephone set 24 via the extension interface 12 (step S5).

After the attribute information was sent as mentioned above, in the embodiment, the telephone set 24 generates an alarm ringing sound on the basis of the transmitted information and, at the same time, the attribute information of the transmission side terminal is displayed by the liquid crystal display unit 30 in the subsequent step S6.

The main CPU 10 compares the attribute information of the transmission side terminal and the attribute information of the data terminal 25 which was stored. If those attribute information differ as a result of the comparison, the main CPU 10 sends the attribute information of the transmission side terminal to the telephone set 24. If the attribute information of the transmission side terminal and the reception side terminal differ, the telephone set 24 displays information indicative of the presence of such a difference. Therefore, the operator of the reception side terminal soon properly performs a necessary procedure to change the setting of the data terminal, so that the communication can be executed.

The information regarding the attribute is displayed in step S6 in the following manner. For instance, assuming that the content of the attributes which are different between the transmission side terminal and the reception side terminal relates to a data transmission rate of the low order layer matching information element, that is, if it is determined in step S4 that the attribute information differ with regard to such a point, the following message can be displayed. Namely, now assuming that, for example, the data transmission rate of the transmission side terminal has been set to 4800 bps and that of the reception side terminal has been set to 2400 bps, the telephone set 24 generates an alarm ringing sound and displays a message such as "Please set to 4800 bps." or the like by the liquid crystal display unit 30. Consequently, the operator can recognize that there is a clear difference between the attributes and which procedure should be executed.

In step S7 subsequent to step S6, a check is made to see if a disconnection message has been received from the network or not. If YES, the processing routine advances to step S12, which will be explained hereinlater. If NO, that is, if no disconnection message is received, step S8 follows. In step S8, a check is made to see if the data set completion key 28 has been depressed or not. If YES, the processing routine advances to step S9 mentioned above.

If the operator knows the difference between the attributes by the process in step S6, he changes the setting. After the setting is changed, the data set completion key 28 is operated. On the other hand, the main CPU 10 monitors the above operation in step S8. After the operator of the extension data terminal 25 changes the setting of the data terminal 25 on the basis of the above display content, he depresses the data set completion key 28 of the telephone set 24, thereby informing the main CPU 10 of the coincidence of the attributes. After that, the processes in step S9 and subsequent steps are executed.

By executing the above processes, a communicable state can be obtained even if the attribute of the extension data terminal 25 differs from the attribute of the transmission side terminal.

If a disconnection message has been received from the network during the above processes, the processes in steps S12 and S13 are executed and the program is finished. That is, in the apparatus, when the attributes of the transmission side terminal and the reception side terminal differ, the process to unconditionally send a release message as shown in FIG. 6 because of the different attributes is not performed. The communication can be started without disconnecting the call even if the attribute of the transmission side terminal differs from the attribute of the data terminal 25 connected to the extension.

However, when the disconnection message has been received from the network (ISDN) side, the release message is sent. That is, in the case where it takes time to change the attribute and a disconnection message is received from the network as mentioned above, information indicating that the disconnection was performed is first displayed by the telephone set 24 (step S11) in the example of the program. In this case, a release message is transmitted to the network (step S12). The program is finished.

In the above embodiment, the data transfer rate of the low order layer matching information element has been used as the content of the attributes which differ between the transmission side terminal and the reception side terminal. However, a similar effect can be also expected even in the case where there is a difference between the attributes such as the number of data bits or the like of the high order layer matching information element or low order layer matching information element.

In the above embodiment, the ISDN has been considered as a digital network. However, even in the case of a digital network having the function to transmit the attribute information of the transmission side terminal to the reception side terminal, a similar effect can be also expected in a private branch network or the like.

Further, in the above embodiment, the attribute information of the data terminal 25 has been held in the memory 11 of the exchange unit 8. However, a similar effect can be also expected even if such attribute information is held in a memory in the ISDN interface 5.

According to the embodiment, there is the effect such that even when the attribute of the transmission side terminal differs from the attribute of the data terminal connected to the extension, the communication can be started without disconnecting the call and the operating efficiency can be raised.

Although the preferred embodiment has been described above, the invention is not limited to the foregoing embodiment but many modifications and variations are possible within the spirit and scope of the appended claims of the invention.

What is claimed is:

1. An exchange apparatus which encloses a plurality of extension terminals and connects the extension terminal designated by a signal from a line wire, comprising:

memory means for storing a first attribute of the plurality of extension terminals; and control means for allowing a second attribute designated by the signal from the line wire to be displayed by one of the plurality of extension terminals, wherein said control means connects the line wire to the one of the plurality of extension terminals after waiting for a predetermined key operation performed at the one of the plurality of extension terminals, if the first attribute of the one of the plurality of extension terminals and the second attribute designated by the signal from the line wire are different from each other, and wherein said control means connects the line wire to the one of the plurality of extension terminals without waiting for the predetermined key operation performed at the one of the plurality of extension terminals, if the first attribute of the one of the plurality of extension terminals and the second attribute designated by the signal from the line wire are not different from each other.

2. An apparatus according to claim 1, wherein said control means compares the second attribute designated by the signal from the line wire with the first attribute of the one of the plurality of extension terminals stored in said memory means and allows the second attribute designated by the signal from the line wire to be displayed by the one of the plurality of extension terminals when said attributes differ.

3. An apparatus according to claim 1, wherein the one of the plurality of extension terminals includes a telephone set and a data terminal.

4. An apparatus according to claim 1, wherein the predetermined operation includes depression of a predetermined key on the one of the plurality of extension terminals.

5. An exchange method in which a memory is provided for storing first attributes of a plurality of extension terminals and a line wire is to be connected to one of the plurality of extension terminals, comprising the steps of:

displaying a second attribute designated by a signal from the line wire on the plurality of extension terminals;

connecting the line wire to the one of the plurality of extension terminals after a predetermined key operation has been performed at the one extension terminal, if a first attribute of the one extension terminal stored in the memory and the second attribute are different from each other; and connecting the line wire to the one extension terminal without waiting for the predetermined key operation to be performed at the one extension terminal, if the first attribute of the one extension terminal stored in the memory and the second attribute are not different from each other.

6. A method according to claim 5, wherein said displaying step compares the second attribute with the first attributes of the plurality of extension terminals stored in the memory and displays the second attribute on the plurality of extension terminals when the first attributes differ from the second attribute.

7. A method according to claim 5, wherein the one of the plurality of extension terminals includes a telephone set and a data terminal.

8. A method according to claim 5, wherein the predetermined key operation includes a depression of a predetermined key on the one of the plurality of extension terminals.

9. A control method of a connection apparatus which connects a data terminal to a communication line, the connection apparatus including a memory for storing a first attribute of the data terminal and including a keyboard, said method comprising the steps of:

displaying a second attribute designated by a signal from the communication line;

connecting the communication line to the data terminal after a predetermined key operation has been performed at the keyboard, if a first attribute stored in the memory and the second attribute are different from each other; and connecting the communication line to the data terminal without waiting for the predetermined key operation to be performed at the keyboard, if the first attribute stored in the memory and the second attribute are not different from each other.

10. A method according to claim 9, wherein said displaying step compares the second attribute with the first attribute of the data terminal stored in the memory and displays the second attribute when the first attribute differs from the second attribute.

11. A control method of a connection apparatus which connects a data terminal to a communication line, said method comprising the steps of:

judging if a first attribute of the data terminal and a second attribute designated by a signal from the communication line are different from each other;

connecting the communication line to the data terminal after a predetermined manual operation has been performed, if the first attribute and the second attribute are different from each other; and connecting the communication line to the data terminal without waiting for the predetermined manual operation to be performed, if the first attribute and the second attribute are not different from each other.

* * * * *

UNITED STATES PATENT AND TRADEMARK OFFICE
CERTIFICATE OF CORRECTION

PATENT NO. : 5,361,299

DATED : November 1, 1994

INVENTOR(S) : MICHIHIRO IZUMI

It is certified that error appears in the above-identified patent and that said Letters Patent is hereby corrected as shown below:

IN THE DRAWINGS

Sheet 2 of 9: "TELEPHON" should read --TELEPHONE--.

COLUMN 1

Line 7, "continuation-in-part" should read --continuation--.

COLUMN 6

Line 43, "audio" should read --audio signal-- and "digital." should read --digital signal.--.
Line 45, "audio" should read --audio signal--.
Line 54, "audio." should read --audio signal.--.
Line 58, "digital." should read --digital signal.--.

COLUMN 7

Line 19, "digital," should read --digital signal,--.
Line 32, "S113)," should read --S113),--.

Signed and Sealed this

Eleventh Day of April, 1995

Attest:

BRUCE LEHMAN

Attesting Officer        Commissioner of Patents and Trademarks